United States Patent
Parmentier et al.

(10) Patent No.: US 12,404,809 B2
(45) Date of Patent: Sep. 2, 2025

(54) HEATING TURBOMACHINE FOR A FUEL-CONDITIONING SYSTEM CONFIGURED TO SUPPLY AN AIRCRAFT TURBOSHAFT ENGINE WITH FUEL FROM A CRYOGENIC TANK

(71) Applicant: SAFRAN, Paris (FR)

(72) Inventors: Nicolas Claude Parmentier, Moissy-Cramayel (FR); Samer Maalouf, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/836,448

(22) PCT Filed: Feb. 9, 2023

(86) PCT No.: PCT/EP2023/053217
§ 371 (c)(1),
(2) Date: Aug. 7, 2024

(87) PCT Pub. No.: WO2023/152232
PCT Pub. Date: Aug. 17, 2023

(65) Prior Publication Data
US 2025/0172093 A1    May 29, 2025

(30) Foreign Application Priority Data
Feb. 11, 2022  (FR) ...................................... 2201236

(51) Int. Cl.
*F02C 7/224*   (2006.01)
*F02C 3/22*    (2006.01)

(52) U.S. Cl.
CPC ................ *F02C 7/224* (2013.01); *F02C 3/22* (2013.01); *F05D 2220/323* (2013.01); *F05D 2260/213* (2013.01)

(58) Field of Classification Search
CPC .................................. F02C 7/224; F02C 3/22
See application file for complete search history.

(56) References Cited

U.S. PATENT DOCUMENTS

2017/0356340 A1*  12/2017  Vaisman ................... F02C 1/10
2018/0100695 A1*   4/2018  Conlon ..................... F02C 3/22
(Continued)

FOREIGN PATENT DOCUMENTS

EP    2385234 A2    11/2011
FR    3110938 A1    12/2021
(Continued)

OTHER PUBLICATIONS

International Search Report for PCT/EP2023/053217, dated Mar. 28, 2023, 2 pages.
(Continued)

*Primary Examiner* — Gerald L Sung
*Assistant Examiner* — Jacek Lisowski
(74) *Attorney, Agent, or Firm* — RANKIN, HILL & CLARK LLP

(57) ABSTRACT

A heating turbomachine for a fuel-conditioning system, which is configured to supply an aircraft turboshaft engine with fuel from a cryogenic tank. The heating turbomachine comprising: compressor; a turbine; a combustion chamber which is configured to discharge a flow of exhaust air loaded with heat energy and to rotate the turbine; at least one fluid circuit in which a heat-transfer fluid circulates in the downstream direction; and at least one post-combustion heat exchanger which is mounted in the fluid circuit and is configured to extract heat energy from the exhaust air chamber flow between the combustion and the turbine.

10 Claims, 4 Drawing Sheets

(56) References Cited

U.S. PATENT DOCUMENTS

2020/0088102 A1* 3/2020 Roberge .................. F02C 7/224
2021/0348561 A1* 11/2021 Cocks ....................... F02C 7/12

FOREIGN PATENT DOCUMENTS

GB          869274 A      5/1961
WO      2022023648 A1    2/2022

OTHER PUBLICATIONS

French Search Report for FR2201236, dated Sep. 16, 2022, 2 pages.

* cited by examiner

HEATING TURBOMACHINE FOR A FUEL-CONDITIONING SYSTEM CONFIGURED TO SUPPLY AN AIRCRAFT TURBOSHAFT ENGINE WITH FUEL FROM A CRYOGENIC TANK

TECHNICAL FIELD

This invention relates to the field of aircraft comprising one or more turboshaft engines supplied by fuel stored in a cryogenic tank.

It is known to store fuel, in particular hydrogen, in liquid form to limit the overall dimension and the weight of the tanks of the aircraft. For example, hydrogen is stored at a temperature of around 20 to 22 Kelvin (−253 to −251° C.) in a cryogenic tank on the aircraft.

In order to be injected into the combustion chamber of a turboshaft engine, the fuel must be heated to allow an optimum combustion. Such a heating step is necessary, for example, to reduce the risk of icing of the water vapor contained in the air circulating in the turboshaft engine, in particular at the level of the fuel injectors of the turboshaft engine.

In practice, the fuel heating step is energy-intensive and requires heat energy to be extracted from hot sources. Among the various technologies for heating liquid fuel, it is known, with reference to FIG. 1, to generate a flow of heating air AC by means of a heating turbomachine 102 supplied, on the one hand, by fuel Q from a cryogenic tank RC and, on the other hand, by an air flow A. A heat exchanger 101 advantageously allows to transfer heat energy from the flow of heating air AC to the flow of liquid fuel Q in order to make it gaseous. It can therefore be consumed in a combustion chamber CC of the turboshaft engine T.

In practice, it is a complex task for the heating turbomachine 102 to generate a large amount of heat with good efficiency. By its very nature, a turbomachine is optimized to maximize its mechanical energy and limit its thermal losses. In practice, the thermal energy generated is proportional to the mechanical energy generated. Also, to generate enough thermal energy to heat the fuel flow, it is necessary to use a large turbomachine that generates a large amount of unwanted mechanical energy.

It is known in the prior art documents FR3110938A1, WO2022/023648A1 and EP2385234A2.

One of the aims of the present invention is to propose a turbomachine that can achieve an optimum heating while having small overall dimensions and a reduced mass.

SUMMARY

The invention relates to a heating turbomachine for a fuel-conditioning system, which is configured to supply an aircraft turboshaft engine with fuel from a cryogenic tank, the heating turbomachine comprising:
- a compressor configured to be supplied with an air flow from an air inlet,
- a turbine connected to the compressor by a turbomachine shaft and
- a combustion chamber which is configured to be supplied, on the one hand, with the air flow from the compressor and, on the other hand, with a fuel flow, the combustion chamber being configured to discharge an exhaust air flow loaded with heat energy and to rotate the turbine, The invention is remarkable in that it comprises at least one fluid circuit in which a heat-transfer fluid circulates from upstream to downstream, and at least one post-combustion heat exchanger which is mounted in the fluid circuit and is configured to extract heat energy from the exhaust air flow between the combustion chamber and the turbine.

Thanks to the invention, the thermal energy of the turbomachine is captured directly at the outlet of the combustion chamber before it is converted into mechanical energy by the turbine. This improves the thermal efficiency of the heating turbomachine, which is advantageous for extracting heat energy configured to heat a fuel flow from a cryogenic tank.

Preferably, the heating turbomachine comprises at least one exhaust heat exchanger which is mounted in the fluid circuit and is configured to heat the heat-transfer fluid from heat energy extracted from the exhaust air flow at the outlet of the turbine. The use of a second exchanger allows to limit the thermal gradient in an exchanger to improve the heat energy recovery.

Preferably, the post-combustion heat exchanger is mounted downstream of the exhaust heat exchanger in the fluid circuit. In this way, the heat-transfer fluid is progressively heated from increasingly hot sources.

Preferably, the post-combustion heat exchanger and the exhaust heat exchanger are mounted adjacent to each other. This reduces the overall dimension required and eliminates the need for connecting pipes between the exchangers.

Preferably, the heat exchangers are aligned along an axis that is orthogonal to the turbomachine shaft so as to facilitate the circulation of the air and heat-transfer fluid flows.

Preferably, the post-combustion heat exchanger extends co-axially with the turbomachine shaft so as to reduce the overall dimensions.

Even more preferably, the combustion chamber is tubular and extends co-axially with the turbomachine shaft. This simplifies the shape of the combustion chamber, since it does not have to go around the shaft as in a conventional turbomachine.

According to one aspect of the invention, the combustion chamber comprises an auxiliary heat exchanger configured to heat a fuel flow configured to supply said combustion chamber. This is particularly advantageous when a fuel flow is used as a heat-transfer fluid. Compactness is significantly increased.

Preferably, the heating turbomachine comprises a first combustion chamber upstream of the post-combustion heat exchanger and a second combustion chamber downstream of the post-combustion heat exchanger. The second combustion chamber allows to increase the temperature of the exhaust air flow before it flows into the turbine, allowing to use a conventional, compact, high-performance turbine suitable for being driven by a high-temperature exhaust flow.

The invention also relates to a fuel-conditioning system configured to supply an aircraft turboshaft engine with fuel from a cryogenic tank, the conditioning system comprising:
- a fuel circuit configured to connect the cryogenic tank to the aircraft turboshaft engine, and
- a heating turbomachine, as described above, for heating the fuel flow circulating in the fuel circuit from heat energy extracted by the heat-transfer fluid, the combustion chamber being supplied with a fuel flow from the fuel circuit.

Preferably, the fuel-conditioning system comprises a heat exchanger mounted in the fuel circuit for exchanging heat energy with the heat-transfer fluid.

In one aspect, the fuel flow is used directly as a heat-transfer fluid in the heating turbomachine.

The invention also relates to an assembly comprising a cryogenic tank, an aircraft turboshaft engine and a fuel-conditioning system, as previously presented, connecting the cryogenic tank to the aircraft turboshaft engine.

The invention also relates to a method for heating a heat-transfer fluid by means of a heating turbomachine, as previously presented, the heat-transfer fluid circulating from upstream to downstream in the fluid circuit, the method comprising the steps consisting in:

Supplying the compressor with an air flow,

Supplying the combustion chamber, on the one hand, with the air flow from the compressor and, on the other hand, with a fuel flow, the combustion chamber discharging an exhaust air flow loaded with heat energy in order to rotate the turbine and Heating the heat-transfer fluid in the post-combustion heat exchanger using heat energy extracted from the exhaust air flow at the outlet of the combustion chamber.

Preferably, the method also comprises a step consisting of heating the heat-transfer fluid in the exhaust heat exchanger using heat energy extracted from the exhaust air flow at the outlet of the turbine.

Also disclosed is a heating turbomachine for a fuel-conditioning system configured to supply an aircraft turboshaft engine from fuel from a cryogenic tank, the heating turbomachine comprising:

a compressor configured to be supplied with an air flow from an air inlet, a turbine connected to the compressor by a turbomachine shaft and a combustion chamber configured to be supplied, on the one hand, with the air flow from the compressor and, on the other hand, with a fuel flow, the combustion chamber being configured to discharge an exhaust air flow loaded with heat energy and to rotate the turbine, The invention is remarkable in that it comprises at least one fluid circuit wherein a heat-transfer fluid circulates from upstream to downstream, and at least one pre-combustion heat exchanger, mounted in the fluid circuit, configured to extract heat energy from the air flow coming from the compressor between the compressor and the combustion chamber.

DESCRIPTION OF THE DRAWINGS

The invention will be better understood on reading the following description, given by way of example, with reference to the following figures, given by way of non-limiting examples, in which identical references are given to similar objects.

It should be noted that the figures set out the invention in detail in order to implement the invention, said figures of course being able to be used to better define the invention if necessary.

DETAILED DESCRIPTION

Figure 1:
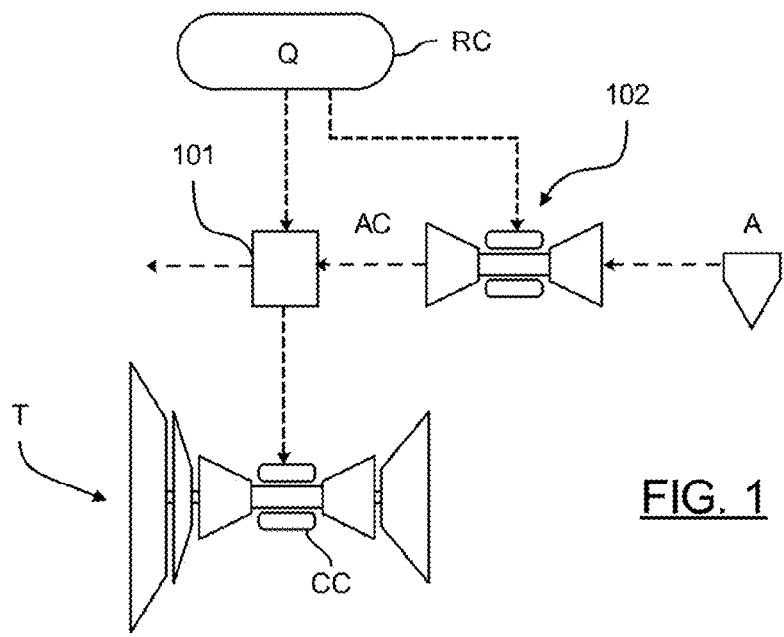
FIG. 1 is a schematic representation of an architecture for conditioning fuel from a cryogenic tank to a turboshaft engine according to the prior art.
Figure 2:
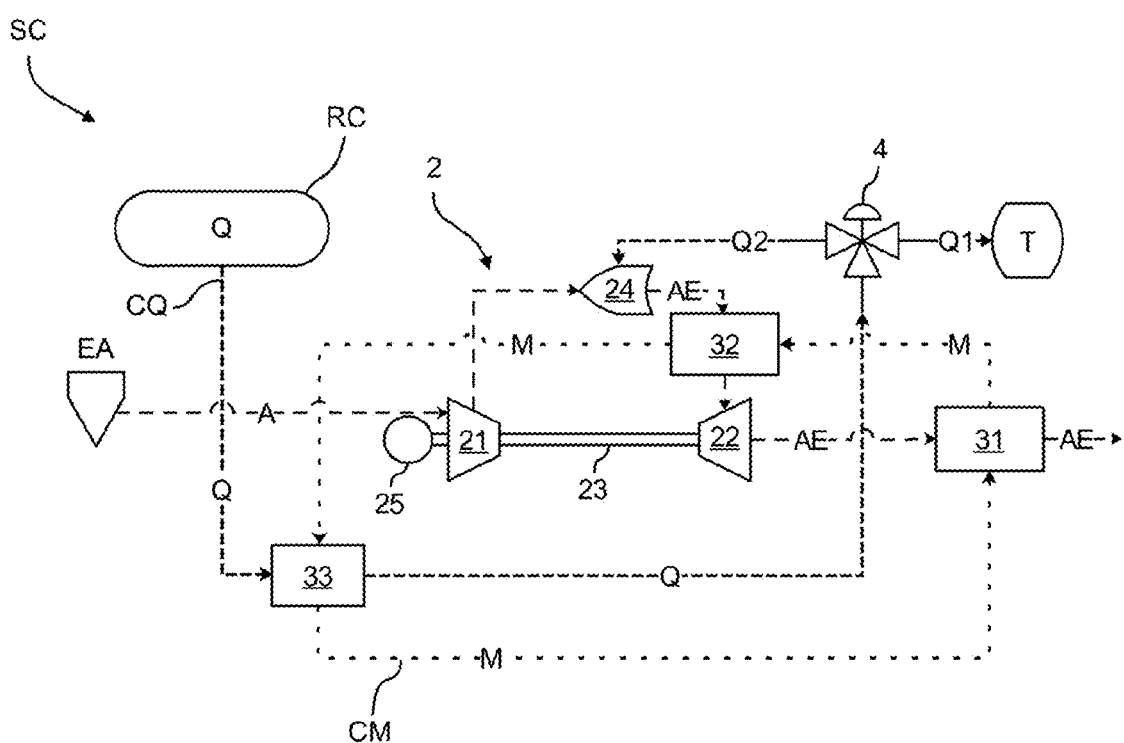
FIG. 2 is a schematic representation of an architecture for conditioning fuel from a cryogenic tank to a turboshaft engine comprising a heating turbomachine according to one embodiment of the invention.

With reference to FIG. 2, there is shown an architecture of a fuel-conditioning system SC according to one embodiment of the invention for conducting fuel Q from a cryogenic tank RC to the combustion chamber of a turboshaft engine T of an aircraft.

In this example, the fuel is liquid hydrogen, but the invention is applicable to other types of fuel, for example liquid methane or liquefied natural gas.

According to the invention, a fuel-conditioning system SC is provided, configured to supply the combustion chamber of the turboshaft engine T with liquid-phase fuel from the cryogenic tank RC. The conditioning system SC allows a fuel flow Q to be extracted from the cryogenic tank RC. As we will see later, the conditioning system SC allows to heat the fuel to an optimum temperature.

With reference to FIG. 2, the conditioning system SC comprises a fuel circuit CQ wherein a fuel flow Q circulates from upstream to downstream. The fuel circuit CQ (closely dashed in FIG. 2) thus comprises an inlet configured to be fluidly connected to the cryogenic tank RC and an outlet configured to be fluidly connected to the turboshaft engine T.

With reference to FIG. 2, the conditioning system SC further comprises a heating turbomachine 2 which comprises a compressor 21 configured to be supplied by an air flow A from an air inlet EA, a turbine 22 connected to the compressor 21 by a shaft 23 and a combustion chamber 24 configured to be supplied, on the one hand, by the air flow A from the compressor 21 and, on the other hand, by a fuel flow Q from the cryogenic tank RC. The combustion chamber 24 is also configured to discharge an exhaust air flow AE loaded with heat energy in order to rotate the turbine 22.

In this example, the compressor 21 comprises a centrifugal stage. Furthermore, in this example, the turbine 22 comprises two axial stages, although this could of course be different. In particular, the turbine 22 could comprise a radial stage followed by an axial stage, only a radial stage or only an axial stage. In this example, the combustion chamber 24 is annular so as to be offset from the shaft 23, but it could of course be mono-tubular as shown below. Preferably, the combustion chamber 24 is a single injector.

The exhaust air flow AE allows to generate mechanical energy via the turbine 22, which can rotate the shaft 23 and the compressor 21. In this example, the heating turbomachine 2 comprises a load 25, secured to the shaft 23, configured to consume this mechanical energy. The load 25 can take a variety of forms, for example, an electric generator, a gearbox, a pump, a transmission system or other.

In this example, the combustion chamber 24 is supplied with a fuel flow Q2 extracted from the fuel circuit CQ upstream of the turboshaft engine T. To this end, the conditioning system SC comprises a distribution member 4, in particular a three-way valve, in order to supply the turboshaft engine T and the combustion chamber 24 with flows of fuel Q1, Q2.

According to the invention, the heating turbomachine 2 also comprises a fluid circuit CM wherein a heat-transfer fluid M circulates from upstream to downstream. In this first embodiment, the heat-transfer fluid M is nitrogen, but it goes without saying that this could be different.

According to the invention, with reference to FIG. 2, the heating turbomachine 2 comprises a post-combustion heat exchanger 32, mounted in the fluid circuit CM, configured to extract heat energy extracted from the exhaust air flow AE at the outlet of the combustion chamber 24. Preferably, the post-combustion heat exchanger 32 is mounted in the fluid circuit CM downstream of the turbine 22 so as to extract heat energy from the exhaust air flow AE, which is hot and has a high pressure. The post-combustion heat exchanger 32 is preferably made from a material suitable for high temperatures, preferably one with low porosity, for example ceramic.

The heating turbomachine 2 also comprises an exhaust heat exchanger 31, mounted in the fluid circuit CM, configured to heat the heat-transfer fluid M from heat energy extracted from the exhaust air flow AE at the outlet of the turbine 22.

In this example, the exhaust heat exchanger 31 is mounted in the fluid circuit CM upstream of the post-combustion heat exchanger 32. The heat-transfer fluid M is thus heated progressively (less thermal gradient) by the exhaust heat exchanger 31 and then the post-combustion heat exchanger 32, which allows to distribute the heat flows. This increases the service life of the heat exchangers 31, 32. It goes without saying that reverse circulation, i.e. from the post-combustion heat exchanger 32 towards the exhaust heat exchanger 31, is also possible. Preferably, the circulation of fluids in each of the heat exchangers 31, 32 can be organized in counter-flow or cross-flow mode, which are efficient. However, a co-current exchange is possible.

Still referring to FIG. 2, the conditioning system SC also comprises a heat exchanger 33 mounted in the fuel circuit CQ and in the fluid circuit CM to allow the heat-transfer fluid M to transmit heat energy to the fuel flow Q in order to heat it. Preferably, the distribution member 4 is positioned downstream of the heat exchanger 33 so as to supply a fuel flow Q1 in the gaseous state to the combustion chamber 24 of the heating turbomachine 2 and to the turboshaft engine T. The heat-transfer fluid M thus circulates in a closed loop.

Figure 3:
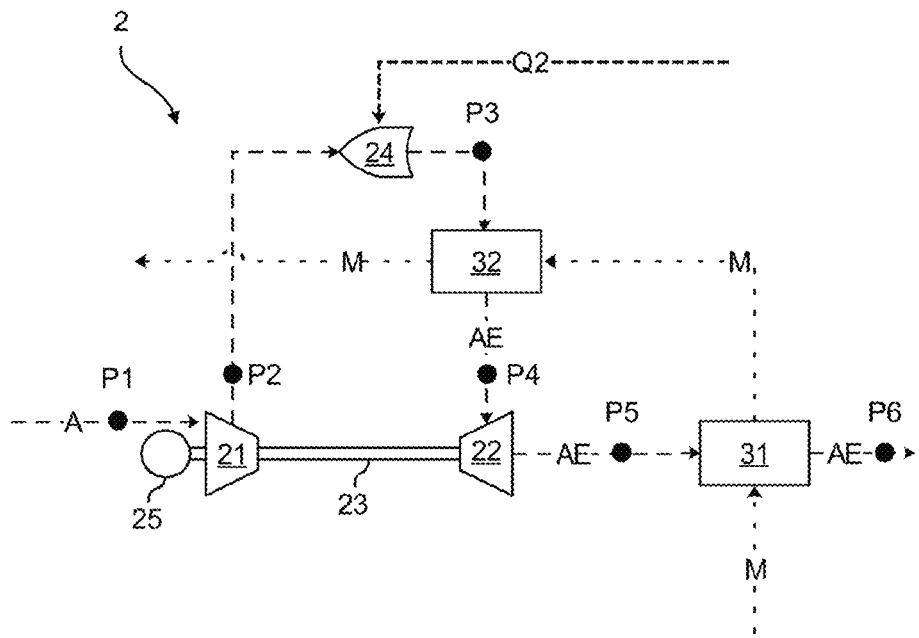
FIG. 3 is a schematic representation of the heating turbomachine shown in FIG. 2.

In this embodiment, the combustion chamber 24 is conventionally positioned between the compressor 21 and the turbine 22, in particular in an annular manner around the shaft 23. The post-combustion heat exchanger 32 is located between the combustion chamber 24 and the turbine 22. This allows the air flow A to move from left to right, as shown in FIG. 3. Preferably, the turbine 22 and the exhaust heat exchanger 31 are axially aligned. The exhaust heat exchanger 31 and the post-combustion heat exchanger 32 are vertically superimposed. This type of architecture makes the heating turbomachine 2 more compact, making it easier to integrate into the conditioning system SC.

Different types of technology can be implemented in the heat exchangers 31, 32, 33, i.e. a tubular technology, a plate technology, a fin technology, etc.

An example of fuel-conditioning is shown in FIG. 2. A fuel flow Q in the liquid state is extracted from the cryogenic tank RC and conducted from upstream to downstream in the fuel circuit CQ. The fuel flow Q is heated in the heat exchanger 33 by circulation of the heat-transfer fluid M. The fuel flows Q1, Q2 are then conveyed to the turboshaft engine T and to the heating turbomachine 2 via the distribution member 4.

Figure 4:
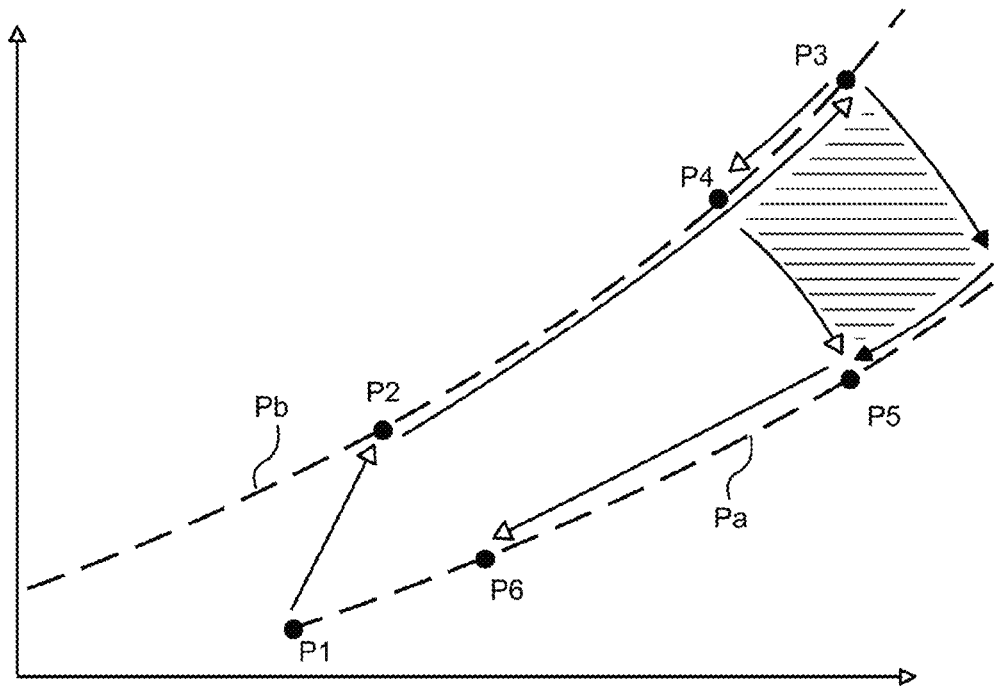
FIG. 4 is a schematic representation of an energy diagram for the heating turbomachine.

With reference to FIG. 3 and FIG. 4, the circulation of the heat-transfer fluid M through the exhaust heat exchanger 31 and then through the post-combustion heat exchanger 32 so as to extract heat energy from the exhaust air flow AE is shown in detail. FIG. 4 schematically shows the energy cycle of the heating turbomachine 2 at various operating points P1-P6, with entropy on the abscissa and temperature on the ordinate.

The heating turbomachine 2 is supplied with an air flow A which is extracted at a first pressure line Pa (FIG. 4) which corresponds, in this example, to the ambient pressure (operating point P1). The air flow A is then compressed by the compressor 21 to reach a second pressure line Pb (FIG. 4), higher than the first pressure line Pa (operating point P2).

The combustion chamber 24 of the heating turbomachine 2 is supplied with a fuel flow Q2 and with the air flow A of second pressure Pb in order to emit an exhaust air flow AE at the outlet having a higher pressure and temperature (operating point P3).

The exhaust air flow AE then passes through the post-combustion heat exchanger 32 to transfer heat energy to it, thereby lowering its temperature and pressure (operating point P4).

The exhaust air flow AE is expanded in the turbine 22, which rotates the compressor 21 via the shaft 23. When it expands, the pressure and the temperature of the exhaust air flow AE drop (operating point P5).

The exhaust air flow AE then passes through the exhaust heat exchanger 31 so as to transfer heat energy to it, thereby lowering its temperature and pressure (operating point P6). Preferably, the exhaust air flow AE is discharged into the ambient environment.

The integration of a post-combustion heat exchanger 32 between the combustion chamber 24 and the turbine 22 advantageously allows the temperature of the heat-transfer fluid M to be increased while lowering the energy supplied to the turbine 22. In other words, this allows thermal recovery to be favored over mechanical energy, which is advantageous in the context of the invention. As shown in the diagram in FIG. 4, the hatched area corresponds to the energy that is consumed thermally instead of mechanically in the absence of a post-combustion heat exchanger 32.

Advantageously, thanks to the invention, the heating turbomachine 2 can maximize the heat-transfer, so the mechanical drive of a load 25 such as a generator is accessory. The post-combustion heat exchanger 32 allows to modulate the heat input to the heat-transfer fluid M. Compared with a conventional auxiliary turbomachine, the thermal efficiency is very high. The thermal energy generated is no longer proportional to the mechanical energy generated.

The method can be implemented to provide different types of control depending on constraints and requirements. For example, the control system can, alternatively:

Maintain the speed of rotation of the heating turbomachine 2 so as to allow an optimum power generation by the load 25, Maintain a constant temperature at the turbine 22 inlet, Maintaining a constant temperature of the heat-transfer fluid M at the outlet of the post-combustion heat exchanger 32, Ensuring a sufficient difference in temperature of the heat-transfer fluid M between the inlet of the exhaust heat exchanger 31 and the outlet of the post-combustion heat exchanger 32 so as to allow an optimum heat energy extraction.

Figure 5:
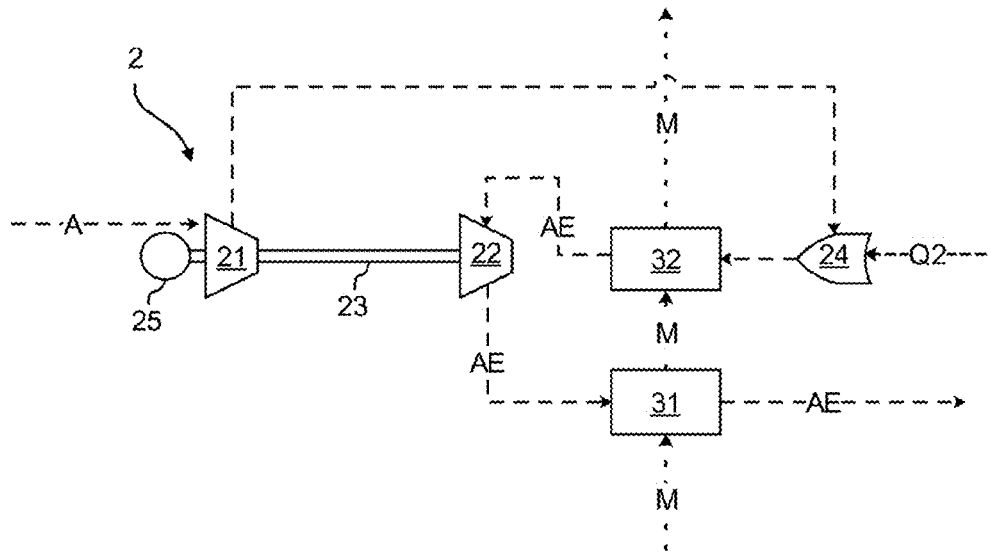
FIG. 5 is a schematic representation of a second type of embodiment of a heating turbomachine.
Figure 6:
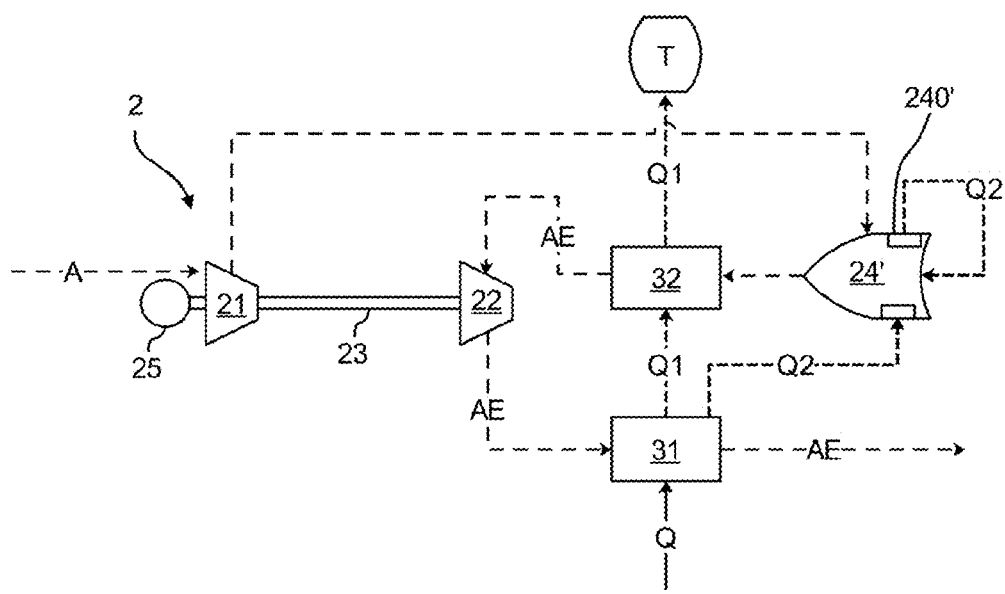
FIG. 6 is a schematic representation of a third type of embodiment of a heating turbomachine.
Figure 7:
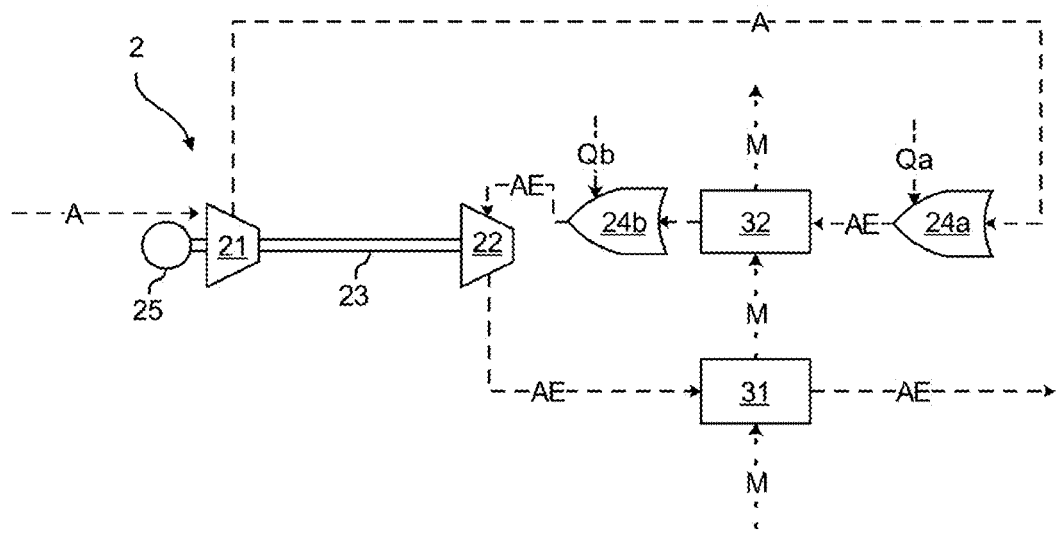
FIG. 7 is a schematic representation of a fourth type of embodiment of a heating turbomachine.

Other embodiments of the invention are shown in FIGS. 5 to 7. For the sake of clarity and brevity, each embodiment is not shown again, and only the differences from the first embodiment are detailed. Similar numerical references are used to describe the different embodiments.

With reference to FIG. 5, a second embodiment of a heating turbomachine 2 according to the invention is shown.

In this embodiment, the turbine 22, the post-combustion heat exchanger 32 and the combustion chamber 24 are axially aligned. Advantageously, such an architecture means that the shaft 23 of the heating turbomachine 2 does not extend into the combustion chamber 24, which simplifies its structure. A combustion chamber 24 with a mono-tubular shape can advantageously be used, which increases compactness.

The exhaust heat exchanger 31 and the post-combustion heat exchanger 32 are also vertically superimposed. This allows heat energy to be captured successively in the two heat exchangers 31, 32. This type of architecture makes the heating turbomachine 2 more compact, making it easier to integrate into the conditioning system SC, Preferably, to avoid any risk of ignition, a non-oxidizing heat-transfer fluid M, such as nitrogen, should be used. However, it is also possible to directly circulate a fuel flow Q1 in the post-combustion heat exchanger 32 with the exhaust air flow AE comprising oxygen.

With reference to FIG. 6, a third embodiment of a heating turbomachine 2 according to the invention is shown, the architecture of which is similar to the second embodiment.

In this embodiment, the fuel flow Q1 is used directly as a heat-transfer fluid and circulates successively in the exhaust heat exchanger 31 and in the post-combustion heat exchanger 32 in order to supply the turboshaft engine T. In other words, the heating turbomachine 2 is mounted directly in the fuel circuit CQ.

According to one aspect of the invention, the heating turbomachine 2 comprises a combustion chamber 24' which comprises an auxiliary heat exchanger 240' configured to extract fuel upstream of the post-combustion heat exchanger 32 and to heat it on contact with the combustion chamber 24'. The fuel flow Q2 heated by the auxiliary heat exchanger 240' is supplied to the combustion chamber 24'. This allows to increase the integration of the heating turbomachine 2 by avoiding the need for a pipe downstream of the post-combustion heat exchanger 32 to supply the combustion chamber 24'. Preferably, the fuel flow Q2 is in the gaseous state at the outlet of the exhaust heat exchanger 31 and a very low flow rate is required to supply the combustion chamber 24'. Since the flow rate is low, the fuel flow Q2 can be heated using a small auxiliary heat exchanger 240'.

With reference to FIG. 7, a fourth embodiment of a heating turbomachine 2 according to the invention is shown, the architecture of which is similar to the second embodiment.

In this embodiment, the heating turbomachine 2 comprises a first combustion chamber 24a upstream of the post-combustion heat exchanger 32 and a second combustion chamber 24b downstream of the post-combustion heat exchanger 32. In other words, the second combustion chamber 24b is mounted between the post-combustion heat exchanger 32 and the turbine 22. Each combustion chamber 24a, 24b is supplied with a fuel flow Qa, Qb which can be controlled independently to obtain the desired operating conditions (temperature delta, turbine inlet temperature 22, etc.).

Advantageously, the second combustion chamber 24b allows to heat the exhaust air flow AE, which has been cooled by the first combustion chamber 24a, so that the exhaust air flow AE has a high temperature when passing through the turbine 22. A high temperature of the exhaust air flow AE allows to optimize the efficiency of the turbine 22 and allows to reduce the overall dimension of the latter. The turbine 22 can advantageously have a structure similar to a conventional turbine.

It goes without saying that the different embodiments can be combined. Several embodiments can use the fuel flow Q as a heat-transfer fluid. Similarly, several embodiments may use two combustion chambers 24a, 24b.

Figure 8:
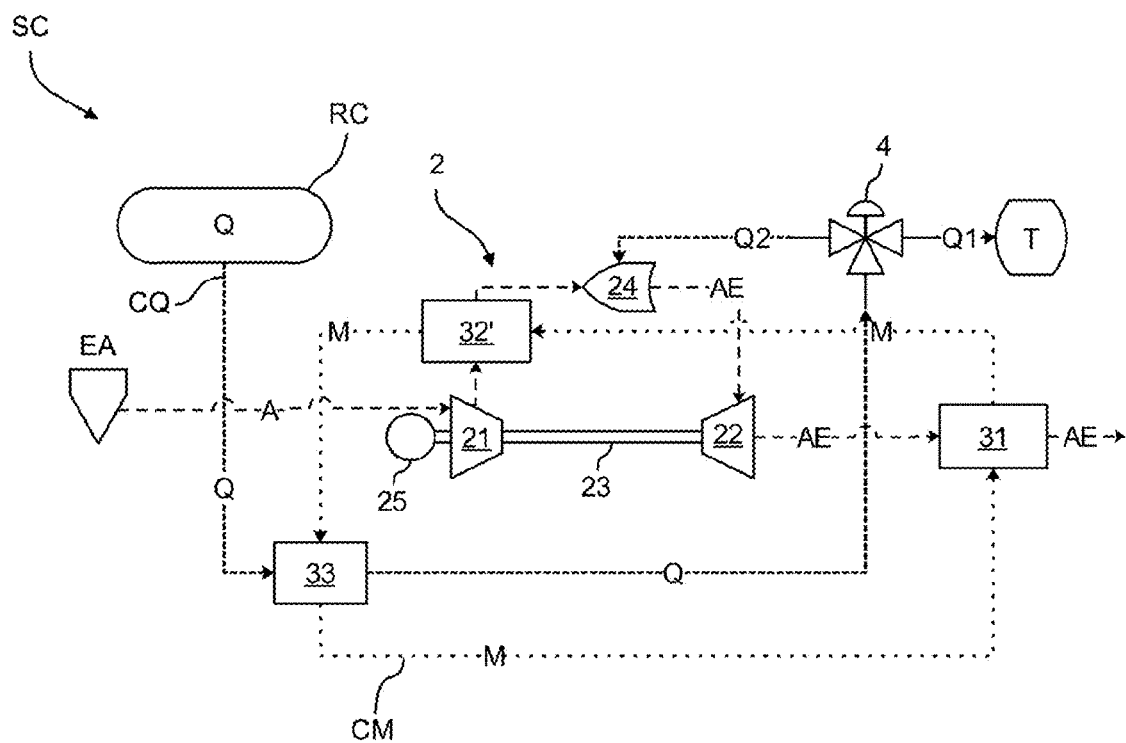
FIG. 8 is a schematic representation of another type of embodiment of a heating turbomachine.

With reference to FIG. 8, a further embodiment of a heating turbomachine 2 is shown, the architecture of which is similar to the second embodiment.

In this embodiment, the heating turbomachine 2 comprises a pre-combustion heat exchanger 32', mounted in the fluid circuit CM, configured to extract heat energy extracted from the accelerated air flow at the outlet of the compressor 21. The pre-combustion heat exchanger 32' is positioned before the combustion chamber 24. A pre-combustion heat exchanger 32' is less exposed to thermal and mechanical stress than a post-combustion heat exchanger 32. A pre-combustion heat exchanger 32' advantageously allows the accelerated intake air flow AI at the outlet of the compressor 21 to be cooled, allowing the combustion chamber 24 to supply greater thermal energy.

The invention claimed is:

1. An assembly comprising a cryogenic tank, an aircraft turboshaft engine and a fuel-conditioning system connecting the cryogenic tank to the aircraft turboshaft engine, the fuel-conditioning system comprising:
    a fuel circuit configured to connect the cryogenic tank to the aircraft turboshaft engine, and
    a heating turbomachine comprising:
        a compressor configured to be supplied by an air flow from an air inlet,
        a turbine connected to the compressor by a turbomachine shaft, and
        a combustion chamber configured to be supplied with the air flow from the compressor and by a fuel flow, the combustion chamber being configured to discharge an exhaust air flow loaded with heat energy and to rotate the turbine,
        at least one fluid circuit in which a heat-transfer fluid circulates from upstream to downstream,
        at least one post-combustion heat exchanger, which is mounted in the at least one fluid circuit and is configured to extract the heat energy from the exhaust air flow between the combustion chamber and the turbine, and
        at least one exhaust heat exchanger which is mounted in the at least one fluid circuit and is configured to heat the heat-transfer fluid from the heat energy extracted from the exhaust air flow at an outlet of the turbine,
        the heating turbomachine being configured to heat a fuel stream circulating through the fuel-conditioning system from the heat energy extracted by the heat transfer fluid, the combustion chamber being supplied by the fuel flow from the fuel-conditioning system.

2. The assembly as claimed in claim 1, wherein the at least one post-combustion heat exchanger is mounted downstream of the at least one exhaust heat exchanger in the at least one fluid circuit.

3. The assembly according to claim 1, wherein the at least one post-combustion heat exchanger and the at least one exhaust heat exchanger are mounted adjacent to each other.

4. The assembly according to claim 1, wherein the at least one post-combustion heat exchanger co-axially extends with the turbomachine shaft.

5. The assembly according to claim 1, wherein the combustion chamber is tubular and co-axially extends with the turbomachine shaft.

6. The assembly according to claim 1, wherein the combustion chamber comprises an auxiliary heat exchanger configured to heat the fuel flow configured to supply said combustion chamber.

7. The assembly according to claim 1, further comprising a first combustion chamber upstream of the at least one post-combustion heat exchanger and a second combustion chamber downstream of the at least one post-combustion heat exchanger.

8. The assembly according to claim 1, further comprising a heat exchanger mounted in the fuel circuit for exchanging heat energy with the heat-transfer fluid.

9. The assembly according to claim 1, wherein the fuel flow is used directly as a heat-transfer fluid in the heating turbomachine.

10. A method for heating the heat-transfer fluid by means of the heating turbomachine in the assembly according to claim 1, the heat-transfer fluid circulating from the upstream to the downstream in the at least one fluid circuit, the method comprising the steps:

supplying the compressor with the air flow, supplying the combustion chamber with the air flow from the compressor and with the fuel flow, the combustion chamber discharging the exhaust air flow loaded with the heat energy in order to rotate the turbine, and heating the heat-transfer fluid in the at least one post-combustion heat exchanger using the heat energy extracted from the exhaust air flow at an outlet of the combustion chamber.

* * * * *